United States Patent [19]

Hicks et al.

[11] Patent Number: 5,523,376
[45] Date of Patent: Jun. 4, 1996

[54] COATING COMPOSITIONS BASED ON ALDIMINES AND POLYISOCYANATES CONTAINING URETDIONE GROUPS

[75] Inventors: Sharon D. Hicks, Pittsburgh; John H. Hunter, Coraopolis; Douglas A. Wicks, Mt. Lebanon, all of Pa.

[73] Assignee: Bayer Corporation, Pittsburgh, Pa.

[21] Appl. No.: 361,270

[22] Filed: Dec. 21, 1994

[51] Int. Cl.$^6$ .......................... C08G 18/00; C08G 18/16; C08G 18/18
[52] U.S. Cl. .................. 528/44; 528/52; 528/73; 524/589; 524/590; 106/287.2; 106/287.25; 252/182.2; 252/182.13
[58] Field of Search .................. 528/44, 73, 52; 106/287.2, 287.25; 252/182.2, 182.13

[56] References Cited

U.S. PATENT DOCUMENTS

| | | | |
|---|---|---|---|
| 3,420,800 | 1/1969 | Haggis | 260/75 |
| 3,567,692 | 3/1971 | Haggis | 260/75 |

*Primary Examiner*—Paul R. Michl
*Assistant Examiner*—Patrick Niland
*Attorney, Agent, or Firm*—Joseph C. Gil; Thomas W. Roy

[57] ABSTRACT

The present invention is directed to coating compositions which have long pot lives and may be rapidly cured under ambient conditions to provide coatings with improved optical properties and resistance to yellowing, such coating compositions containing as binder a) a polyisocyanate component containing
   i) 5 to 100% by weight of a polyisocyanate adduct containing uretdione groups and
   ii) 0 to 95% by weight of a monomeric polyisocyanate, an NCO prepolymer or a polyisocyanate adduct other than i), and
b) an aldimine based on the reaction product of a polyamine having 2 or more primary amino groups with an aldehyde corresponding to the formula:

$$O=CHCH(R_1)(R_2)$$

wherein $R_1$ and $R_2$ may be the same or different and represent optionally substituted hydrocarbon radicals, or $R_1$ and $R_2$ together with the β-carbon atom form a cycloaliphatic or heterocyclic ring, wherein components a) and b) are present in an amount sufficient to provide an equivalent ratio of isocyanate groups to aldimine groups of 0.5:1 to 20:1.

14 Claims, No Drawings

COATING COMPOSITIONS BASED ON ALDIMINES AND POLYISOCYANATES CONTAINING URETDIONE GROUPS

BACKGROUND OF THE INVENTION

1. Field of the Invention

The present invention is directed to coating compositions having long pot lives, short dry times under ambient conditions and a reduced tendency to yellow when exposed to elevated temperatures in which the binder is based on aldimines and polyisocyanates containing uretdione groups which have improved compatibility with the aldimines.

2. Background of the Invention

Coating compositions which may be cured at room temperature are known. One-component coating compositions contain fully reacted polyurethanes as the binder. These compositions have the advantage that they are available as fully formulated systems which may be directly applied to suitable substrates without any preliminary steps except for mild stirring. Disadvantages of these systems are that large amounts of organic solvents are needed to reduce the viscosity of fully reacted, i.e., high molecular weight, polyurethanes. The coating compositions are cured by evaporation of the solvent which is objectionable from an environmental perspective. In addition, in order to solubilize the polyurethanes in organic solvents, they must be essentially linear polyurethanes. While such polyurethanes possess properties which are suitable for many applications, they do not provide certain properties, e.g., solvent resistance which may be obtained from crosslinked polyurethanes.

Two-component coating compositions are also known. These compositions come in two containers. The first contains a polyisocyanate, while the second contains an isocyanate-reactive component, generally a polyol. The components are not mixed until they are ready to be used. One advantage of these compositions is that because the components are not pre-reacted to form a high molecular weight polymer, a suitable processing viscosity can be achieved without the need for large amounts of organic solvents. In addition, higher functional components can be used to obtain highly crosslinked coatings which possess properties which surpass those possessed by one-component coatings.

The disadvantages of these compositions is that they cannot be applied without a preliminary mixing step in which it is critical that the components are mixed in the right proportions. In addition, special metering and mixing equipment is needed to conduct this process on a commercial scale. If the components are mixed in the wrong proportions, then the properties of the resulting coatings can be substantially affected. In addition, after the components are mixed they must be used in a timely fashion. If not, they continue to react until an unusable solid is obtained.

Coating compositions which possess the advantages of the known one- and two-component coating compositions without possessing their disadvantages may be prepared by blending the polyisocyanate adducts such as trimers and biurets with certain aldimines. However, coatings prepared from these known components are unacceptable due to their appearance. Further improvements are needed in clarity, gloss and distinctness of image (DOI) in order for these compositions to be useful in coating applications. These properties are directly related to the compatibility between the polyisocyanate and the aldimine.

In addition, coatings prepared from coating compositions containing polyisocyanates and aldimines have a tendency to yellow upon exposure to elevated temperatures. This yellowness may be caused during curing at elevated temperatures or it may be caused when a coating, cured at ambient temperature, is subsequently exposed to elevated temperatures, e.g., coatings which are exposed to direct sunlight.

It is an object of the present invention to improve the clarity, gloss and DOI and resistance to yellowing of coating compositions based on polyisocyanates and aldimines. This object may be achieved with coating compositions containing, as binder, aldimines and polyisocyanates containing uretdione groups, optionally in admixture with other polyisocyanates such as polyisocyanates containing isocyanurate groups.

U.S. Pat. Nos. 3,420,800 and 3,567,692 disclose coating compositions containing polyisocyanates and either aldimines or ketimines. However, these patents do not teach that the compatibility of the binder components can be improved by the use of polyisocyanates according to the present invention. It has previously been disclosed in copending application, U.S. Ser. No. 08/171,281, that the compatibility of polyisocyanates with aldimines may be improved by using polyisocyanates containing allophanate groups derived from monoalcohols. However, there is no suggestion that similar improvements in clarity could also be obtained with polyisocyanates containing uretdione groups or that these latter polyisocyanates also result in a coating with improved resistance to yellowing at elevated temperatures.

SUMMARY OF THE INVENTION

The present invention is directed to coating compositions which have long pot lives and may be rapidly cured under ambient conditions to provide coatings with improved optical properties and resistance to yellowing, such coating compositions containing as binder a) a polyisocyanate component containing
  i) 5 to 100% by weight of a polyisocyanate adduct containing uretdione groups and
  ii) 0 to 95% by weight of a monomeric polyisocyanate, NCO prepolymer or polyisocyanate adduct other than i), and
b) an aldimine based on the reaction product of a polyamine having 2 or more primary amino groups with an aldehyde corresponding to the formula:

$$O\!\!=\!\!CHCH(R_1)(R_2)$$

wherein $R_1$ and $R_2$ may be the same or different and represent optionally substituted hydrocarbon radicals, or $R_1$ and $R_2$ together with the β-carbon atom form a cycloaliphatic or heterocyclic ring, wherein components a) and b) are present in an amount sufficient to provide an equivalent ratio of isocyanate groups to aldimine groups of 0.5:1 to 20:1.

DETAILED DESCRIPTION OF THE INVENTION

In accordance with the present invention it has been discovered that polyisocyanates containing uretdione groups have excellent compatibility with aldimines. Because of this compatibility, the resulting coatings have improved clarity, gloss and DOI when compared to coatings prepared from compositions which do not contain uretdione groups. In addition to using the polyisocyanates containing uretdione groups as the only polyisocyanate component, these polyisocyanates may also be blended with other monomeric polyisocyanates, polyisocyanate adducts or NCO prepolymers to improve their compatibility with aldimines. Further, the polyisocyanates containing uretdione groups may also be prepared in a manner such that they contain other groups such as isocyanurate groups.

The polyisocyanates containing uretdione groups may be prepared in accordance with U.S. Pat. No. 4,929,724 (the disclosure of which is herein incorporated by reference) by dimerizing a portion of the isocyanate groups of an organic diisocyanate in the presence of a dimerization catalyst containing phosphorus-nitrogen bonds and a co-catalyst containing an isocyanate-reactive group and having a pKa-value of at least 6.

Examples of suitable diisocyanates to be used as starting materials for preparing the polyisocyanates containing uretdione groups include aliphatic diisocyanates having 4 to 18 carbon atoms in the divalent aliphatic hydrocarbon chain. Examples of these organic diisocyanates include 1,4-tetramethylene diisocyanate, 1,6-hexamethylene diisocyanate, 2,2,4-trimethyl-1,6-hexamethylene diisocyanate and 1,12-dodecamethylene diisocyanate. 1,6-hexamethylene diisocyanate is especially preferred.

It is also possible in accordance with the present invention to use blends of the previously mentioned diisocyanates with mono-isocyanates or polyisocyanates having 3 or more isocyanate groups for the preparation of the polyisocyanates containing uretdione groups, provided that the isocyanate groups of the monoisocyanates or polyisocyanates are aliphatically bound.

The polyisocyanates containing uretdione groups may be blended with the previously described monomeric diisocyanates, with the other known monomeric diisocyanates containing araliphatically, cycloaliphatically or aromatically bound isocyanate groups, with other polyisocyanate adducts or with NCO prepolymers to improve their compatibility with aldimines. These other polyisocyanate adducts include those containing isocyanurate, uretdione, biuret, urethane, allophanate, carbodiimide and/or oxadiazinetrione groups. The polyisocyanates adducts have an average functionality of 2 to 6, an NCO content of 5 to 30% by weight and include:

1) Isocyanurate group-containing polyisocyanates which may be prepared as set forth in DE-PS 2,616,416, EP-OS 3,765, EP-OS 10,589, EP-OS 47,452, U.S. Pat. No. 4,288,586 and U.S. Pat. No. 4,324,879. The isocyanato-isocyanurates generally have an average NCO functionality of 2.5 to 4.5, preferably 3 to 3.5 and an NCO content of 5 to 30%, preferably 10 to 25% and most preferably 15 to 25% by weight.

2) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 2.5 to 4.5, preferably 3 to 3.5.

3) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 4.5, preferably 2.5 to 3.

4) Allophanate group-containing polyisocyanates which may be prepared from monofunctional, difunctional or higher functional, low or high molecular weight polyols as described in U.S. Pat. Nos. 3,769,318, 4,160,080 and 4, 177,342. The allophanate group-containing polyisocyanates have a most preferred NCO content of 12 to 21% by weight and an (average) NCO functionality of 2.5 to 4.5.

5) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

6) Polyisocyanates containing oxadiazinetrione groups and containing the reaction product of two moles of a diisocyanate and one mole of carbon dioxide.

Preferred polyisocyanate adducts are the polyisocyanates containing isocyanurate groups, biuret groups or urethane groups.

Instead of using mixtures of polyisocyanates containing uretdione groups and polyisocyanate adducts which have been separately prepared, in certain cases it is possible to prepare these mixtures in one step. For example, mixtures of polyisocyanates containing uretdione groups and isocyanurate groups may be prepared by trimerizing the isocyanate starting material in the presence of dimerization/trimerization catalysts such as tertiary phosphines or peralkylated phosphorus acid triamides. Suitable catalysts and methods of the production of these polyisocyanate mixtures are disclosed, e.g., in U.S. Pat. Nos 4,614,785 and 4,994,541, the disclosures of which are herein incorporated by reference.

In addition to monomeric polyisocyanates and polyisocyanates adducts, the polyisocyanates containing uretdione groups may also be blended with NCO prepolymers to improve their compatibility with aldimines.

The NCO prepolymers are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 400 to about 6,000, preferably 800 to about 3,000, and optionally low molecular weight compounds with molecular weights below 400. The molecular weights are number average molecular weights ($M_n$) and are determined by end group analysis (NH number). Products obtained by reacting polyisocyanates exclusively with low molecular weight compounds are polyisocyanates adducts containing urethane groups and are not considered to be NCO prepolymers.

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred. Further details concerning the low molecular weight compounds and the starting materials and methods for preparing the high molecular weight poly-hydroxy compounds are disclosed in U.S. Pat. No. 4,701,480, herein incorporated by reference.

These NCO prepolymers generally have an isocyanate content of about 0.5 to 30% by weight, preferably about 1 to 20% by weight, and are prepared in known manner by the reaction of the above mentioned starting materials at an NCO/OH equivalent ratio of about 1.05:1 to 10:1 preferably about 1.1:1 to 3:1. This reaction may take place in a suitable solvent which may optionally be removed by distillation after the reaction along with any unreacted volatile starting polyisocyanates still present. In accordance with the present invention NCO prepolymers also include NCO semi-prepolymers which contain unreacted starting polyisocyanates in addition to the urethane group-containing prepolymers.

In mixtures with monomeric polyisocyanates, polyisocyanate adducts or NCO prepolymers to provide improved compatibility, the polyisocyanates containing uretdione groups should be present in an amount of at least 5% by weight, preferably at least 25% by weight and more preferably at least 40% by weight, based on the solids content of the polyisocyanate component. The upper limit is 100% by weight, preferably 90% by weight and more preferably 80% by weight, based on the solids content of the polyisocyanate component. The remainder of component a) is made up of component ii).

It is also possible in accordance with the present invention to use polyisocyanates containing uretdione groups and, e.g., iso-cyanurate groups, to compatibilize other polyisocyanate adducts or NCO prepolymers, provided that the resulting mixture contains the previously disclosed amounts of polyisocyanates containing uretdione groups.

Suitable aldimines for use in combination with the polyisocyanate mixtures include those prepared from an aldehyde and polyamines containing two or more, preferably 2 to 6 and more preferably 2 to 4, primary amino groups. The polyamines include high molecular weight amines having molecular weights of 400 to about 10,000, preferably 800 to about 6,000, and low molecular weight amines having molecular weights below 400. The molecular weights are number average molecular weights ($M_n$) and are determined by end group analysis (OH number). Examples of these polyamines are those wherein the amino groups are attached to aliphatic, cycloaliphatic, araliphatic and/or aromatic carbon atoms.

Suitable low molecular polyamines starting compounds include tetramethylene diamine, ethylene diamine, 1,2- and 1,3-propane diamine, 2-methyl-1,2-propane diamine, 2,2-dimethyl-1,3-propane diamine, 1,3-and 1,4-butane diamine, 1,3- and 1,5-pentane diamine, 2-methyl-1,5-pentane diamine, 1,6-hexane diamine, 1,7-heptane diamine, 1,8-octane diamine, 1,9-nonane diamine, 1,10-decane diamine, 1,11-dodecane diamine, 1-amino-3-aminomethyl-3,5,5-trimethyl cyclohexane, bis-(4-aminocyclohexyl)-methane, bis-( 4-amino-3-methylcyclohexyl)-methane, 1,2- and/or 1,4-cyclohexane diamine, 1,3-bis(methylamino)-cyclohexane, 1,8-p-menthane diamine, hydrazine, hydrazides of semi-carbazido carboxylic acids, bis-hydrazides, bis-semicarbazides, phenylene diamine, 2,4- and/or 2,6-toluylene diamine, 2,3- and/or 3,4-toluylene diamine, polyphenylene polymethylene polyamines of the kind obtained by the aniline/formaldehyde condensation reaction, N,N,N-tris-(2-aminoethyl)amine, guanidine, melamine, N-(2-aminoethyl)-1,3-propane diamine, 3,3'-diamino-benzidine, polyoxypropylene amines, polyoxy-ethylene amines, 2,4-bis-(4'-aminobenzyl)-aniline and mixtures thereof.

Preferred polyamines are 1-amino-3-aminomethyl-3,5,5-trimethylcyclohexane (isophorone diamine or IPDA), bis-(4-amino-cyclohexyl)methane, bis-(4-amino-3-methylcyclohexyl)-methane, 1,6-diaminohexane, 2-methyl pentamethylene diamine and ethylene diamine.

Suitable high molecular weight polyamines correspond to the polyhydroxyl compounds used to prepare the NCO prepolymers with the exception that the terminal hydroxy groups are converted to amino groups, either by amination or by reacting the hydroxy groups with a diisocyanate and subsequently hydrolyzing the terminal isocyanate group to an amino group. Preferred high molecular weight polyamines are amine-terminated polyethers such as the Jeffamine resins available from Texaco.

Suitable aldehydes are those corresponding to the formula

$$O=CHCH(R_1)(R_2)$$

wherein $R_1$ and $R_2$ may be the same or different and represent optionally substituted hydrocarbon radicals, preferably containing 1 to 10, more preferably 1 to 6, carbon atoms, or $R_1$ and $R_2$ together with the β-carbon atom form a cycloaliphatic or heterocyclic ring.

Examples of suitable aldehydes include isobutyraldehyde, 2-ethyl hexanal, 2-methyl butyraldehyde, 2-ethyl butyraldehyde, 2-methyl valeraldehyde, 2,3-dimethyl valeraldehyde, 2-methyl undecanal and cyclohexane carboxaldehyde.

The aldimines may be prepared in known manner by reacting the polyamines with the aldehydes either in stoichiometric amounts or with an excess of aldehyde. The excess aldehyde and the water which is produced can be removed by distillation. The reactions may also be carried out in solvents, other than ketones. The solvents may also be removed by distillation after completion of the reaction.

The amounts of the polyisocyanates and aldimines are selected to provide an equivalent ratio of isocyanate groups to aldimine groups of 0.5:1 to 20:1, preferably 0.8:1 to 3:1 and more preferably 1:1 to 2:1.

In addition to the binder components, the coating compositions may also contain the known additives from coatings technology, such as fillers, pigments, softeners, high-boiling liquids, catalysts, UV stabilizers, anti-oxidants, microbiocides, algicides, dehydrators, thixotropic agents, wetting agents, flow enhancers, matting agents, anti-slip agents, aerators and extenders. The additives are chosen based on the requirements of the particular application and their compatibility with components a) and b). The coating compositions may be applied to the substrate to be coated by conventional methods such as painting, rolling, pouring or spraying.

The coating compositions according to the invention have good storage stability and provide coatings which have relatively fast dry times. The coatings are also characterized by high hardness, elasticity, very good resistance to chemicals, high gloss, good weather resistance, good environmental etch resistance and good pigmenting qualities.

It is believed that the combination of fast dry times and good storage stability is due to the fact that water catalyzes the reaction between the polyisocyanate and the aldimine. While the prior art indicates that the curing mechanism takes place by hydrolyzing the aldimine to the amine which then reacts with the isocyanate. This is not the mechanism which takes place in accordance with the present invention. This is easily confirmed by the fact that aldehydes are not released during the curing reaction. The direct reaction between the aldimines and polyisocyanates does not take place in the absence of catalysts such as atmospheric moisture, which accounts for the excellent storage stability. However, after the coating composition has been applied to a suitable substrate, the same components which did not react when present in admixture in storage, rapidly react to form a coating. The reason for this phenomenon is believed to be the catalytic effect of atmospheric moisture.

The invention is further illustrated, but is not intended to be limited by the following examples in which all parts and percentages are by weight unless otherwise specified.

EXAMPLES

Polyisocyanate 1

A mixture containing 70 parts by weight of a uretdione group-containing polyisocyanate, i.e., dimerized 1,6-hexamethylene diisocyanate and 30 parts by weight of N,N',N''-tris-(6-isocyanatohexyl)isocyanurate together with minor quantities of higher homologs of both products. In its 100% solvent free form, the polyisocyanate had an average viscosity of 150 mPa.s at 23° C. and an average NCO content of 22.5% (available from Miles as Desmodur N 3400).

Polyisocyanate 2

An isocyanurate group-containing polyisocyanate prepared from 1,6-hexamethylene diisocyanate and having an isocyanate content of 21.6%, a content of monomeric diisocyanate of <0.2% and a viscosity at 20° C. of 3000 mPa.s (available from Miles Inc. as Desmodur N 3300).

Polyisocyanate 3

A biuret group-containing polyisocyanate prepared from 1,6-hexamethylene diisocyanate and having an isocyanate content of about 23%, a content of monomeric diisocyanate of <0.7% and a viscosity at 25° C. of 1300–2200 mPa.s (available from Miles Inc. as Desmodur N 3200).

Polyisocyanate 4

A biuret group-containing polyisocyanate prepared from 1,6-hexamethylene diisocyanate and having an isocyanate content of about 22%, a content of monomeric diisocyanate of <0.7% and a viscosity at 25° C. of 5000–10,000 mPa.s (available from Miles Inc. as Desmodur N 100).

Aldimine 1

The aldimine of bis-(4-aminocyclohexyl)-methane and isobutraldehyde was prepared by initially charging 1514.3 parts (21 equivalents) of isobutraldehyde and then slowly charging 2104.0 parts (20 equivalents) of bis-(4-aminocyclohexyl)-methane over a period of thirty minutes to avoid an exotherm. After the addition of the diamine the reaction mixture was stirred for one hour. At this time stirring was stopped and water was allowed to settle to the bottom of the reactor. As much water as possible was drained from the bottom of the reactor. The reaction mixture was then heated to 100° C. to remove excess isobutraldehyde. While maintaining a temperature of 100° C., a vacuum of approximately 20 mm Hg was applied to remove any final traces of aldehyde. Thereafter the vacuum was increased to 1 mm Hg to remove water until the water content was less than 0.05% (approximately 1 to 3 hours.) The aldimine had a viscosity of 100 mPa.s at 25° C., an equivalent weight of 159.3, an APHA color of 70, a purity as determined by GPC of 93.5% and a water content of less than 0.05%.

Aldimine 2

The aldimine of 2-methyl pentamethylene diamine and isobutyraldehyde was prepared using the procedure described for aldimine 1.

Aldimine 3

The aldimine of isophorone diamine and isobutyraldehyde was prepared using the procedure described for aldimine 1.

Performance of Compatibility Testing for Table 1

To perform the initial compatibility testing, 1 to 1 volume amounts of the neat polyisocyanate resins were combined with the neat aldimine resins and mixed by hand for one minute. The mixtures were evaluated for compatibility based on appearance using the criteria of immiscibility and cloudiness as indicators. The mixtures were rated immediately, after standing for one hour and after standing for 24 hours. In each case, no changes were seen from the initial ratings. The results are set forth in the following tables. A rating of excellent means that the components mixed together with minimal effort and with no turbidity or cloudiness. A rating of good means that the components mixed together with more than minimal effort, but with no turbidity or cloudiness. A rating of fair means that the components mixed together with more than minimal effort and the mixture was turbid or cloudy. A rating of poor means that the components were either immiscible or that more than minimal effort was needed to mix the components and the resulting mixture was extremely turbid or cloudy.

TABLE 1

Resin Compatibility of Aldimines with Uretdione-Containing and Non-Uretdione-Containing Polyisocyanates

| | ald 1 | ald 2 | ald 3 |
|---|---|---|---|
| Polyiso 1 | good | good | good* |
| Polyiso 2 (Comp) | poor | poor | poor |
| Polyiso 3 (Comp) | | | poor |
| Polyiso 4 (Comp) | poor | poor | poor |

*initially cloudy, but became and remained clear after 5–10 minutes

Table 1 demonstrates that uretdione modified polyisocyanates are more compatible with aldimine resins than polyisocyanates which do not contain uretdione groups.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition which has a long pot life and may be rapidly cured under ambient conditions to provide a coating with improved optical properties and resistance to yellowing, said coating composition containing as binder
   a) a polyisocyanate component containing
      i) 25 to 100% by weight of a polyisocyanate adduct containing uretdione groups and prepared from 1,6-hexamethylene diisocyanate and
      ii) 0 to 75% by weight of a monomeric polyisocyanate, an NCO prepolymer or a polyisocyanate adduct other than i), and
   b) an aldimine based on the reaction product of a polyamine having 2 or more primary amino groups with an aldehyde corresponding to the formula:

$$O=CHCH(R_1)(R_2)$$

wherein $R_1$ and $R_2$ may be the same or different and represent hydrocarbon radicals, or $R_1$ and $R_2$ together with the β-carbon atom form a cycloaliphatic or heterocyclic ring,
   wherein components a) and b) are present in an amount sufficient to provide an equivalent ratio of isocyanate groups to aldimine groups of 0.5:1 to 20:1.

2. The coating composition of claim 1 wherein component a)ii) is a polyisocyanate adduct.

3. The coating composition of claim 1 wherein component a)ii) is a polyisocyanate adduct containing isocyanurate groups.

4. The coating composition of claim 1 wherein polyisocyanate component a) is prepared from 1,6-hexamethylene diisocyanate.

5. The coating composition of claim 2 wherein polyisocyanate component a) is prepared from 1,6-hexamethylene diisocyanate.

6. The coating composition of claim 3 wherein polyisocyanate component a) is prepared from 1,6-hexamethylene diisocyanate.

7. A coating composition which has a long pot life and may be rapidly cured under ambient conditions to provide a coating with improved optical properties and resistance to yellowing, said coating composition containing as binder
a) a polyisocyanate component containing
   i) 25 to 100% by weight of a polyisocyanate adduct containing uretdione groups and prepared from 1,6-hexamethylene diisocyanate and
   ii) 0 to 75% by weight of a polyisocyanate adduct other than i), and
b) an aldimine based on the reaction product of a polyamine having 2 or more primary amino groups with an aldehyde corresponding to the formula:

O=CHCH($R_1$)($R_2$)

wherein $R_1$ and $R_2$ may be the same or different and represent hydrocarbon radicals containing 1 to 6 carbon atoms, wherein components a) and b) are present in an amount sufficient to provide an equivalent ratio of isocyanate groups to aldimine groups of 0.5:1 to 20:1.

8. The coating composition of claim 7 wherein component a)ii) is a polyisocyanate adduct containing isocyanurate groups.

9. The coating composition of claim 7 wherein polyisocyanate component a) is prepared from 1,6-hexamethylene diisocyanate.

10. The coating composition of claim 8 wherein polyisocyanate component a) is prepared from 1,6-hexamethylene diisocyanate.

11. The coating composition of claim 7 wherein said aldehyde comprises isobutyraldehyde or 2-ethyl hexanal.

12. The coating composition of claim 8 wherein said aldehyde comprises isobutyraldehyde or 2-ethyl hexanal.

13. The coating composition of claim 9 wherein said aldehyde comprises isobutyraldehyde or 2-ethyl hexanal.

14. The coating composition of claim 10 wherein said aldehyde comprises isobutyraldehyde or 2-ethyl hexanal.

* * * * *